J. Greenhalgh.
Loom Shedding.

No. 2,451. Reissued Jan. 15, 1867.

Witnesses,
H. Austin Parks.
John H. Taylor

Inventor.
James Greenhalgh

N. PETERS, PHOTO-LITHOGRAPHER, WASHINGTON, D. C.

United States Patent Office.

GEORGE CROMPTON, OF WORCESTER, MASSACHUSETTS, ASSIGNEE OF JAMES GREENHALGH.

*Letters Patent No.* 9,377, *dated November* 2, 1852, *extended* 7 *years; reissue No.* 2,451, *dated January* 15, 1867.

IMPROVEMENT IN LOOMS.

The Schedule referred to in these Letters Patent and making part of the same.

TO ALL WHOM IT MAY CONCERN:

Be it known that I, JAMES GREENHALGH, late of Waterford, Massachusetts, now of Woonsocket, in the county of Providence, and State of Rhode Island, have invented certain new and useful Improvements in Power Looms; and I do hereby declare that the following is a full, clear, and exact description thereof, reference being had to the drawings, which make part of the description.

Similar letters of reference indicate corresponding parts in each of the several figures. Those parts of the loom to which the invention has no reference are, for the most part, omitted in the figures.

Figure 4:
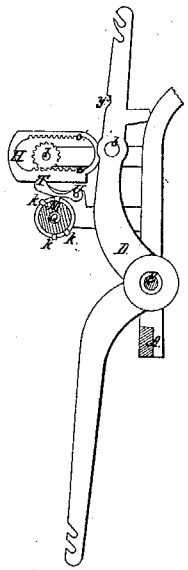
Figures 3 and 4 are elevations in detail of parts thereof.
Figure 3:
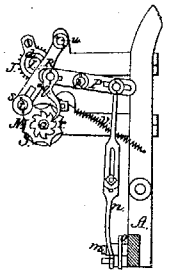
Figure 2:
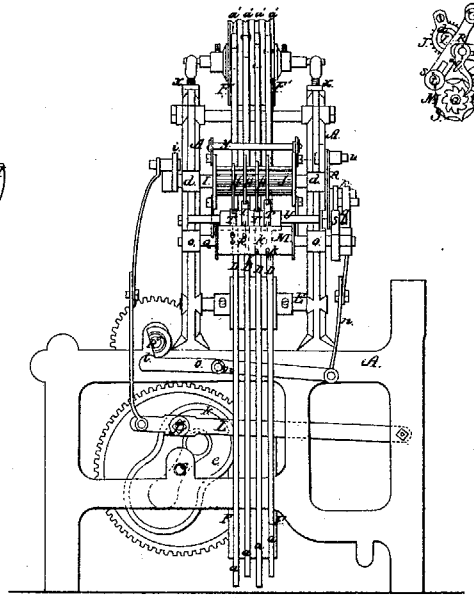
Figure 2 is a side elevation of the same.
Figure 1:
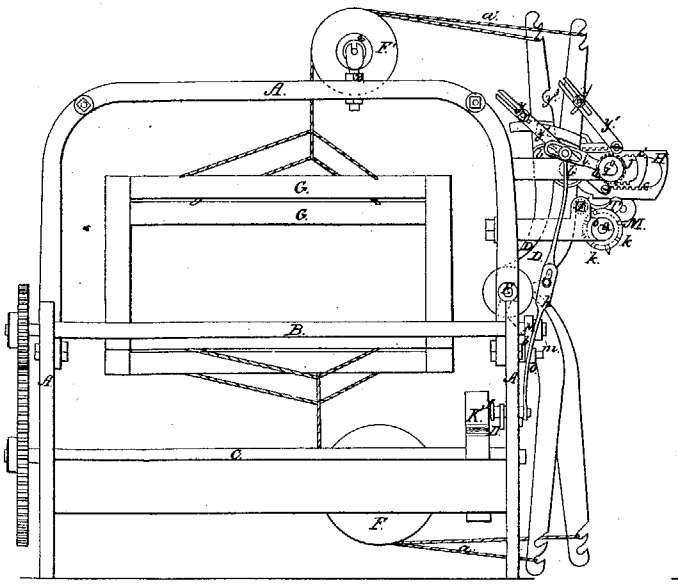
Figure 1 is a back elevation of a power loom having my improvements applied.

These improvements relate to the harness motion of fancy looms, and consist in certain new combinations and arrangements of well-known parts.

Prior to the date of my invention, fancy looms were well known which were provided with leaves of heddles, double systems of levers for operating them, and with mechanism actuated by the main shaft to lift and depress the leaves of heddles when vibrating parts connected with them have been properly arranged, through the intervention of a pattern barrel or chain. Looms of the cam or tappet variety, in which the desired leaves of heddles were lifted and depressed by revolving cams or tappets, through the intervention of a single system of upright levers, each lever of the system being properly connected to a leaf of heddles, were also known.

In the former looms great varieties of changes of figure are attainable by complexity of mechanism, and with the disadvantages incident thereto. In the latter the changes of figure are limited, but the mechanism is simple.

The object of my invention is to furnish a loom having all the excellencies of the former class without many of the disadvantages; and this is, as may be stated in general terms, attained by combining with the heddles and lever system of the latter class the pattern chain and actuating mechanism of the former class.

In the drawings, A is the framing of the loom; B is the main shaft; C a cam shaft, driven in the usual way by gearing from the main shaft. D D are a series of long upright levers, double treadles or jacks hanging on an axle, E, there being one lever for each leaf of heddles, G G, with the ends thereof connected to the leaf of heddles by cords, *a a*, *a′ a′*, passing over pulleys, F F, F′ F′. These levers or double treadles are hung at about the middle of their length, as usual with treadles of this description, and the essential characteristics of this class of levers are that they are upright, and by means of a proper connection from each end of each one, substantially such as described, with the heddles, cause these latter to move up and down, while the ends of the levers themselves move in arcs whose chords are horizontal, or nearly so; this single series of levers, with their connections, forming a very simple and convenient mechanism, by means of which the leaves of heddles may be moved or sustained in position, as contrasted with the other mechanism heretofore used in fancy looms, where at least two series of horizontal or bell-crank levers connected, not only to the heddle leaves, but also to each other, were employed. By inspection of the drawings it will be perceived that the ends of these upright levers are notched in more than one place at each end for the reception of the cords, which may be shifted from notch to notch, thereby altering the range of motion of any one or more of the heddle leaves, while the range of motion of the levers and their actuating mechanism remains the same, and neither the line of motion of the heddles nor the adjustment of the mechanism, by and through which the levers are moved, is changed. It will also be seen that one set of the pulleys, over which the cords pass, is adjustable in position by reason of the screw standards supporting the same, being held in place on the framing by nuts, *x x*; by shifting the latter the position of the pulleys, and consequently the tension upon the cords, can be varied and adjusted, and this provision for adjustment is useful for several reasons. To each one of the upright levers is pivoted at *b* a vibrating attachment, provided with a double set of notches or shoulders, *c c′*. These vibrating attachments must have motion in at least two lines or curves, one motion being derived from the pattern cylinder or chain, the other from mechanism actuated by the main shaft, and reciprocating to and fro at each beat of the lay. Each of these vibrating attachments rests in a notch in each one of a series of toes, T, pivoted at V, and these toes rest upon a pattern cylinder, M, provided with projecting pins, K, and free to revolve in journals *o*. This cylinder is actuated by a pawl, *q*, acting as a ratchet-wheel, *r*, mounted on the shaft Q, the pawl being driven by a lever, P, vibrated by a connecting-rod, *n*, pivoted to one end of a lever, O, oscillating on *m*, and forced to oscillate by the cam N on the shaft B. On the shaft Q a stop-wheel, S, is mounted, in the recesses of which engages a roller, *s*, mounted on a lever, R, and held to its work by a spring, *v*; the pattern cylinder, or chain if preferred, and the mechanism for moving and arresting it at the proper times and in the proper positions, being such as have been hitherto used and well known.

If the pattern should require extending beyond what would be practicable with the cylinder, it can be done by passing an endless chain over the cylinder, the said chain being provided with studs or other projections, which would operate on the lifters and vibrating attachments, and govern the operation of the harness in the same manner as the studs on the cylinder. As the cylinder or chain moves, it raises or permits to fall each of the vibrating attachments, thus determining in what direction each lever and its attached leaf of heddles shall be moved prior to the movement thereof. Between the two arms of each of the series of vibrating attachments is arranged the reciprocating mechanism J, having shoulders operating at the same time in opposite directions, and shown in the drawings as a long drum provided with cog-teeth. It is mounted on a shaft, I, resting in journals, *d*, and having secured to it an arm, *i*, moved by a connecting-rod, *h*, attached to one end of a lever, L, pivoted to the loom-frame at *g*, and carrying a stud, *f*, provided with a roller which runs in a groove, *e*, in a cam, K, on the shaft C; the purpose of this train of mechanical elements and that connected with the pattern cylinder being, as in other looms, to cause the reciprocating mechanism to move so as to give a complete vibration of each long upright lever for each beat of the lay, and to vibrate the vibrating attachments by the motion of the pattern cylinder, which latter takes place when the shed is closed.

The motions of the parts of the loom described may be briefly stated as follows: All the upright levers and heddles being in the central position, the chain or cylinder moves, and when it stops certain of the vibrating attachments are raised and others lowered, depending upon the contour of that part of the chain then acting on the toes, so that all the vibrating attachments are in gear either with the upper or lower notches of the reciprocating mechanism. This mechanism then carries in one direction all the long upright levers, whose vibrators are in gear with its uppermost notches, and in the reverse direction all the long levers whose vibratory attachments are in gear with its lowermost notches, and the levers being connected with the heddles form a shed. The reciprocating mechanism then returns to its first position, carrying with it all levers and heddles, thus closing the shed. During the time that the shed is open the shuttle is thrown, and at or about the time the shed is closed, the pattern cylinder moves again, selecting anew the vibrating attachments, which are again acted upon by the reciprocating mechanism, so as to raise and lower the leaves of heddles. As the ultimate and effective purpose of the reciprocating mechanism is to raise and lower leaves of heddles, this mechanism is really a lifter and depresser. I have stated that it is preferred to make the vibrating attachments and reciprocating mechanism with a series of notches or cogs and racks, or so that there is a gear like that of cog-teeth between the reciprocating mechanism and vibrating attachments; the effect of this construction is that it prevents the tension of the warp threads or other causes from moving the heddles faster than the reciprocating mechanism moves. In order to obviate all danger of any leaf of heddles not being returned to the centre or closed shed line, I apply to the reciprocating mechanism eveners, *y y*, which are long rods attached to links, $y^1$ $y^1$, connected to pivots on the reciprocating mechanism; these rods lie the one between the long levers and the loom-frame, and the other in the notches $y^3$ $y^3$, and they move with the reciprocating mechanism, and act as eveners do in looms made prior to my invention.

The long upright levers are represented in the drawings as bent inwards at their point of suspension. By thus constructing them so as to throw their weight outside of a vertical plane passing through that point and increasing the weight of the levers or their overhang, they will counterbalance, or aid to counterbalance, the harness, thus saving power in working the loom, and favoring regularity and steadiness of motion. By further reference to the drawings it will be perceived that I have arranged the upright levers next the loom-frame, and the pattern cylinder or chain outside of the levers, thus placing the levers near their work, which is to move the leaves of heddles, making the connection with the heddles comparatively short, and giving ample room for the cylinder and its operating mechanism, and also affording opportunity for the operator to shift and adjust the chain or cylinder readily. I have also arranged the vibrating attachments above the centre of the long upright lever, thus leaving room for a long pattern chain between said attachments and the floor.

I claim as of my own invention—

1. A series of long upright levers, one for each leaf of heddles, and each connected at each end to a leaf of heddles, substantially as described, in combination with a series of vibrating attachments capable of motion in at least two directions, as specified, the combination being as described, whereby power may be applied either to lift or depress leaves of heddles in the manner specified.

2. I claim a series of long upright levers, one for each leaf of heddles, and each connected to a leaf of heddles, substantially as specified, in combination with a series of vibrating attachments, capable of motion in at least two directions, as described, and a pattern cylinder or chain, which determines the position of said attachments, and consequently the direction in which each lever shall be reciprocated prior to the movement thereof, the combination being substantially such as hereinbefore described.

3. I claim the series of upright levers and of vibrating attachments and the pattern chain or cylinder, all in combination as specified in the second claim, in combination with reciprocating mechanism, which, through the intervention of the vibrating attachments and the series of upright levers and the connections, shifts the sheds by acting on the leaves of heddles, the combination being such as herein set forth.

4. In combination with leaves of heddles, and a series of upright levers, having characteristics as described,

I claim an adjustable connection between said levers and the leaves of heddles, whereby the range of perpendicular motion of the heddles may be changed without altering the range of horizontal motion of the levers or the range of motion of the reciprocating mechanism, the combination being and acting as described.

5. In combination with a series of upright levers, having characteristics as specified, and operating to elevate and depress leaves of heddles, I claim eveners or adjusters, operating substantially in the manner and for the purpose described; and also in combination with said series of levers and their eveners, a series of vibrating attachments; and also, in combination with said series of levers, eveners, and vibrating attachments, reciprocating mechanism to move the levers, which are returned to their mean position by the eveners, these three combinations each being and operating as specified.

6. In combination with a series of upright levers, having characteristics as specified, a pattern chain or cylinder and a series of vibrating attachments, I claim toes, through which the chain or cylinder acts upon the vibrating attachments, this combination being and acting substantially as described.

7. I claim the arrangement, substantially as described, of leaves of heddles, side of the loom-frame, series of upright levers and pattern cylinder or chain, substantially as described, the gist of the arrangement being that the leaves of heddles are within the frame, the upright levers close to but outside of the frame, and the pattern chain outside of the levers, whereby the advantages herein described are attained.

8. I claim arranging the vibrating attachments and their pivots above the axis upon which the upright levers oscillate, with the pattern chain below the vibrating attachments, substantially in the manner and for the purpose specified.

9. I claim a series of upright levers, having characteristics as specified, in combination with leaves of heddles and a pattern cylinder or chain, as described; and I also claim these elements of a machine in combination with reciprocating mechanism, the combination being substantially such as herein specified.

10. I claim, in combination with a series of upright levers and heddle leaves and cords connecting them, an adjustable mechanism, as described, whereby the tension of the cords may be varied, as set forth.

11. I claim, in combination, reciprocating mechanism and vibrating mechanism, when the two gear together in the manner described, whereby the vibrating attachments are prevented from moving faster than the reciprocating mechanism, as set forth, and also these mechanisms thus constructed to gear together in combination with a pattern chain, substantially as described.

12. I claim, in combination with vibrating pieces so constructed as to embrace reciprocating mechanism, a reciprocating mechanism, a pattern chain or cylinder, and a series of long upright levers, having characteristics as set forth, all substantially such as described and acting in combination as set forth.

And lastly, I claim constructing long upright levers, having characteristics and connections as described, with a bend therein as specified, so that their weight is outside of the axis upon which they oscillate, thereby attaining the results desired and described.

JAMES GREENHALGH.

Witnesses:

N. AUSTIN PARKS,

JOHN H. TAYLOR.